United States Patent
Sakai

(10) Patent No.: US 6,838,064 B2
(45) Date of Patent: Jan. 4, 2005

(54) APPARATUS FOR CONTACT REACTION BETWEEN DIFFERENT GASES

(75) Inventor: Hitoshi Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 519 days.

(21) Appl. No.: 09/954,343

(22) Filed: Sep. 17, 2001

(65) Prior Publication Data

US 2002/0034462 A1 Mar. 21, 2002

(30) Foreign Application Priority Data

Sep. 21, 2000 (JP) ........................................ 2000-286747

(51) Int. Cl.⁷ .............................. B01J 8/06; B01J 12/00
(52) U.S. Cl. ....................................... 422/211; 422/239
(58) Field of Search ................................ 422/211, 236, 422/238, 239, 240; 48/198.2, DIG. 5

(56) References Cited

U.S. PATENT DOCUMENTS

| | | | |
|---|---|---|---|
| 3,525,595 A | * 8/1970 | Zirngibl et al. | ............. 422/158 |
| 5,935,533 A | * 8/1999 | Kleefisch et al. | ............ 422/211 |
| 6,309,612 B1 | * 10/2001 | Balachandran et al. | ....... 422/22 |
| 6,403,041 B1 | * 6/2002 | Takahashi et al. | .......... 422/240 |

FOREIGN PATENT DOCUMENTS

JP 11-90210 A * 4/1999 ............ B01J/12/00

OTHER PUBLICATIONS

"*Proceedings of the Fifth International Conference on Inorganic Membranes*" Nagoya, Jun. 22–26, 1998, (p. 358–361) and (p. 612–615).

* cited by examiner

*Primary Examiner*—Kiley S. Stoner
*Assistant Examiner*—Kevin P. Kerns
(74) *Attorney, Agent, or Firm*—Burr & Brown

(57) ABSTRACT

An apparatus for reactions between different gases, includes a hollow body having a first feeding section that receives a first gas and is made of a porous material having through-pores, and a second feeding section that receives a second gas and surrounds the first feeding section. The first gas diffuses toward the second feeding section from the through-pores to give rise to a contact reaction between the first gas and the second gas through the through-pores. The end openings of the through pores have an sufficient total area to match the amount of the second reactive gas received, and each end opening has a sufficient area to provide a linear velocity of diffusion of the first reactive gas that is larger than the linear velocity of diffusion of the second reactive gas at the through-pore end openings in the direction opposing the diffusion direction of the first gas.

6 Claims, 1 Drawing Sheet

APPARATUS FOR CONTACT REACTION BETWEEN DIFFERENT GASES

BACKGROUND OF THE INVENTION (1) Field of the Invention

The present invention relates to an apparatus for contact reactions between different gases. More particularly, the present invention relates to an apparatus for contact reactions between different gases which can specify and control the feeding conditions of different reactive gases comprehensively and appropriately, which can give rise to uniform contact and reaction of the gases, and which can give improved productivity.

(2) Description of Related Art

As a contact reaction between different gases, there is known, for example, a partial oxidation reaction which comprises subjecting a hydrocarbon gas (e.g. methane or a naphtha) to a contact reaction with oxygen or air to produce a synthetic gas composed of carbon monoxide and hydrogen. In this partial oxidation reaction, it is necessary for higher productivity to control the amount of oxygen or air that is fed at a level that matches the amount of the hydrocarbon gas that is fed. When the amount of oxygen or air is too large, oxidation proceeds more than is necessary, and the reaction product becomes carbon dioxide and water, making it impossible to obtain the intended synthetic gas. When the oxygen amount is too small, the reaction is insufficient, also making it impossible to obtain the intended gas efficiently.

In such a partial oxidation reaction, an apparatus is used having an oxygen-or air-feeding section made of a porous material having though-pores so that oxygen or air can be fed to the reaction system in a uniformly dispersed state (Proceedings of the Fifth International Conference on Inorganic Membranes, Nagoya, Jun. 22–26, 1998, B-408, P-231).

In the above apparatus, it is possible to make the amount of oxygen or air that is fed to the reaction system fairly constant. With the above apparatus, however, no comprehensive and reliable techniques have yet been established with respect to (1) appropriately controlling the amount of fed oxygen or air to match the amount of fed hydrocarbon gas, (2) preventing counter-diffusion of hydrocarbon gas into the through-pores of the feeding section of oxygen or air, and (3) reducing the pressure loss in the feeding section of oxygen or air.

SUMMARY OF THE INVENTION

In view of the above problems of the prior art, the present invention aims to provide an apparatus for contact reactions between different gases which can specify and control the feeding conditions of different reactive gases comprehensively and appropriately, which gives rise to uniform contact and reaction of the gases and which improves productivity.

The present inventor made a study in order to solve the above problems. As a result, the present inventor found out that the above objective could be achieved by setting the total area of the openings of the through-pores present on the surface of the oxygen-or air-feeding section (made of a porous material having through-pores) so that the amount of oxygen or air that is fed can match the amount of hydrocarbon gas fed, and further, by setting the opening area of each through-pores so that the linear velocity of diffusion of oxygen or air in the through-pore can be at a particular level. The present invention has been completed based on these findings.

The present invention provides an apparatus for contact reactions between different gases, including a hollow body consisting of a first feeding section and a second feeding section. The first feeding section receives a first reactive gas and is made of a porous material having through-pores. The second feeding section receives a second reactive gas and is formed so as to surround the first feeding section. The first reactive gas is successively diffused toward the second feeding section from the through-pore ends to give rise to a contact reaction between the first reactive gas and the second reactive gas through the through-pores of the first feeding section. The total areas of the end openings of the through-pores which are present on an outer surface of the first feeding section facing an internal surface of the second feeding section is sufficient to be capable of matching an amount of the second reactive gas that is fed, and the area of each of the openings of the through-pores is sufficient to show a linear velocity of diffusion of the first reactive gas at the through-pore end openings in a through-pore axial direction that is larger than a linear velocity of diffusion of the second reactive gas at the end openings of the through-pores in a through-pore axial direction opposing the diffusion direction of the first reactive gas.

According to one aspect of the present invention, the apparatus for contact reactions between different gases is provided, wherein the first feeding section has a porosity in a range of 1 to 50%.

According to another aspect of the present invention, the apparatus for contact reactions between different gases is provided, wherein the total area of the end openings of the through-pores is sufficient to make a linear velocity of diffusion of the first reactive gas at the end openings of the through-pores in a through-pore axial direction at least equal to a value of 0.3 to 1.4 cm/sec.

According to another aspect of the present invention, the apparatus for contact reactions between different gases is provided, wherein the total pressure loss in the through-pores of the first feeding section is 3 atm or less.

According to another aspect of the present invention, the apparatus for contact reactions between different gases is provided, wherein the first reactive gas is oxygen or air and the second reactive gas is a hydrocarbon.

According to another aspect of the present invention, the apparatus for contact reactions between different gases is provided, wherein the first feeding section has a cylindrical shape.

DETAILED DESCRIPTION OF THE INVENTION

One embodiment of the apparatus of the present invention is specifically described below with reference to the accompanying drawings.

Figure 1:
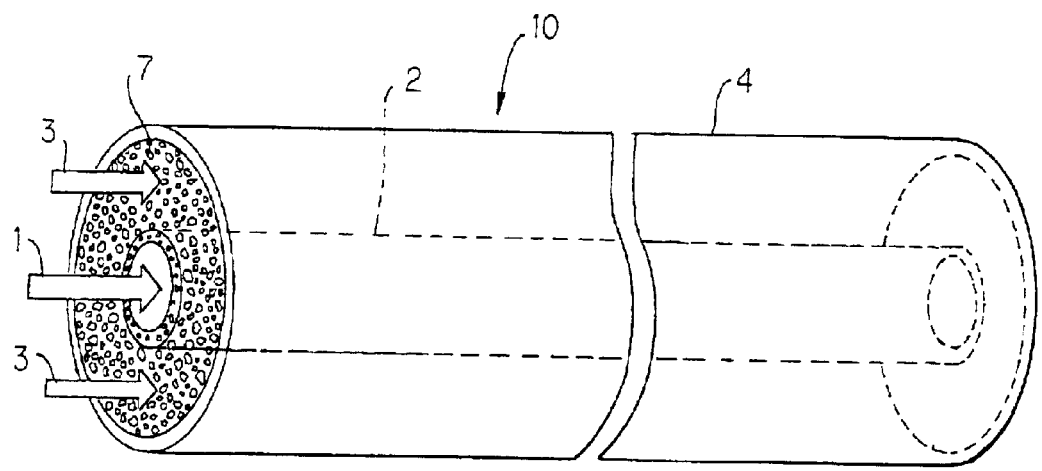
FIG. 1 is a drawing schematically showing one embodiment of the apparatus for contact reaction between different gases according to the present invention.

As shown in FIG. 1, the apparatus 10 of the present invention is an apparatus for subjecting different reactive gases to a contact reaction. The apparatus 10 includes a first feeding section 2 having a hollow tubular shape made of a porous material and having through-pores that extend perpendicular to the axis of the first feeding section 2. A first reactive gas 1 is introduced into the first feeding section.

The apparatus 10 also includes a second feeding section 4 formed around the first feeding section 2. The second feeding section 4 covers the whole outer surface of the first feeding section 2, and a second reactive gas 3 is introduced into the second feeding section 4.

Figure 2:
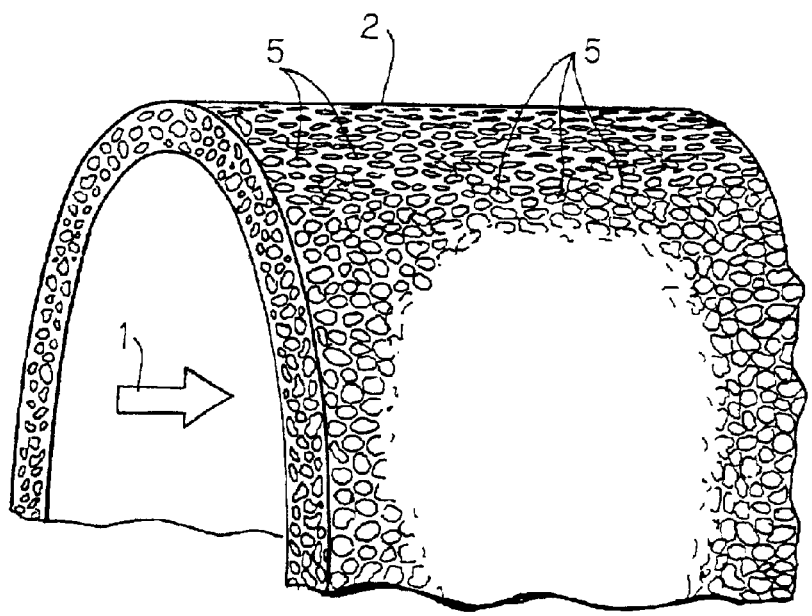
FIG. 2 is a drawing schematically showing a first feeding section made of a porous material having through-pores, which is a constituent of the apparatus of FIG. 1.

As shown in FIG. 2, the apparatus 10 of the present invention is constituted so that the first reactive gas 1 can pass through the through-pores of the first feeding section 2 and be successively diffused toward the second feeding section 4 in a direction that is perpendicular to the axis of the first feeding section from the end openings 5 of the through-pores to give rise to a contact reaction between the first reactive gas 1 and the second reactive gas 3.

In FIG. 2, the end openings 5 of the through-pores that are present on the inner surface of the first feeding section are not shown.

Ordinarily, a catalyst 7 is filled between the second feeding section 4 and the first feeding section 2, as shown in FIG. 1. The first reactive gas 1 that is introduced into the first feeding section 2 via an inlet for the first reactive gas (not depicted) is successively diffused from its through-pore end openings 5 toward the second feeding section 4, and is subjected to a contact reaction with the second reactive gas 3 that is fed from an inlet for the second reactive gas (not depicted) in the portion in which the catalyst 7 is filled.

In this case, it is possible that the catalyst 7 is filled in the first feeding section 2 and the first reactive gas 1 is introduced into the second feeding section 4 is successively diffused toward the first feeding section 2 from the end openings 5 of its through-pores and is subjected to a contact reaction with the second reactive gas 3 introduced into the first feeding section, in the portion in which the catalyst 7 is filled.

In the apparatus 10 of the present invention, the total area of the end openings 5 of the through-pores which are present on an outer surface of the first feeding section 2 facing the internal surface of the second feeding section 4 is sufficient to be capable of matching the amount of the second reactive gas 3 fed. Additionally, each of the through-pore end openings 5 has an area that is sufficient to show a linear velocity of diffusion of the first reactive gas 1 at the through-pore end openings 5 in a through-pore axial direction that is larger than a linear velocity of diffusion of the second reactive gas 3 at the through-pore end openings in a through-pore axial direction opposing the diffusion direction of the first reactive gas 1.

As to the apparatus for contact reaction between different gases used in the present invention, there is no particular restriction as long as the apparatus enables a contact reaction between different reactive gases. Examples include a partial oxidation reaction apparatus wherein a hydrocarbon gas (e.g. methane or a naphtha) is reacted with oxygen or air to produce a synthetic gas composed of carbon monoxide and hydrogen, an apparatus for selective oxidation of carbon monoxide, a dehydrogenation reaction apparatus wherein propane is reacted with oxygen or air to produce propylene, an oxidation reaction apparatus wherein butane is reacted with oxygen or air to produce maleic anhydride, and a partial oxidation reaction apparatus wherein methane is reacted with oxygen or air to produce acetaldehyde.

The reactive gases used in the present invention can be any reactive gases that react with each other upon contact. The present invention is particularly effective for gases which need be fed under appropriately specified and controlled conditions, for example, gases used in the above-mentioned partial oxidation reaction.

Examples of the specific combinations of reactive gases used in the present invention can include a hydrocarbon gas (e.g. methane or a naphtha) and oxygen or air, propane and oxygen or air, carbon monoxide and oxygen or air, and butane and oxygen or air.

As to the first feeding section, there is no particular restriction as long as the first feeding section is made of a porous material having through-pores passing from the inner surface to the outer surface thereof. However, the first feeding section preferably has a cylindrical shape. The material of the first feeding section can include, for example, metal, alumina, titania, zirconia, cordierite, zeolite, silicon nitride, silicon carbide and mullite.

The porosity (as measured by the Archimedes method) of the first feeding section is specifically set preferably at 1 to 50%, more preferably at 5 to 30%, and more preferably at 10 to 20%. This porosity corresponds to [(opening areas (S) of individual through-pore end openings)/(surface area of first feeding section)×100].

When the porosity of the through-pores of the first feeding section is less than 1%, a very large pressure difference is required in order to secure that the necessary amount of air or oxygen is fed. When the porosity is greater than 50%, it may be difficult to secure the specified linear velocity of diffusion of the first reactive gas.

The linear velocity of diffusion of the first reactive gas at the through-pore end openings in the perpendicular direction of the axis of the first gas feeding section is preferably specified to be at least equal to 0.3 to 1.4 cm/sec. The reason for this requirement is given below.

As to the interdiffusion between two different gases when they are mixed, the following formula was proposed by Fujita in the report under the title of ["Diffusion Coefficient in Gas Phase (Member's Contribution)," Kagakukikai, Vol. 15, No. 5, 1951, pp.234 to 236, contributed by Shigebumi Fujita]:

$$D=0.00070T^{1.833}(1/M_1+1/M_2)^{1/2}/\{(Tc_1/Pc_1)^{1/3}+(Tc_2/Pc_2)^{1/3}\}^3 \quad (1)$$

In formula (1), D is an interdiffusion coefficient ($cm^2$/sec), Tc is a critical temperature (K), Pc is a critical pressure (atm), T is a temperature (K), M is a molecular weight, and 1 and 2 in $M_1$, $M_2$, $Tc_1$, $Pc_1$, $Tc_2$, and $Pc_2$ represent each kind of a gas, respectively.

From the above formula, it is appreciated that the interdiffusion coefficient D is in a range of approximately 0.1 to 2 $cm^2$/sec, although it differs depending upon the kinds and temperatures of the gases used.

The linear velocity of diffusion of the second reactive gas depends upon the concentration gradient. When, for example, the concentration at the reaction side (the second feeding section) is 100% and the concentration at the first feeding section is 0%, the average diffusion distance x at t=1 second becomes 0.3 to 1.4 cm from $x=(Dt)^{1/2}$.

Consequently, when the average linear velocity of diffusion of the second reactive gas in a through-pore axial direction is in a range of 0.3 to 1.4 cm/sec, it becomes necessary to set the linear velocity of diffusion of the first reactive gas at a level that is equal to or larger than the above linear velocity of diffusion of the second reactive gas, in a direction perpendicular to the axis of the first feeding section, that is, a through-pore axial direction opposite to the direction of diffusion of the second reactive gas, in order to prevent the counter-diffusion of the second reactive gas. Therefore, the linear velocity of diffusion of the first reactive gas at each through-pore end opening in the through-pore axial direction is preferably set so as to be at least equal to a value of 0.3 to 1.4 cm/sec.

If the linear velocity of diffusion of the first reactive gas at each through-pore end openings in the direction perpendicular to the axis of the first feeding section is too large, that is, if the area of the end opening of each through-pore is too small, the pressure loss in the through-pores of the first feeding section increases and such an apparatus may be low in practical usability. Hence, the area of the opening of each through-pore is preferably sufficient to keep the pressure loss in the through-pores of the first feeding section preferably at 3 atm or less, more preferably at 1 atm or less.

The reason for the above setting is as follows. A pressure lower than 10 atm is effective from the standpoints of law regulation and economy. A pressure loss exceeding 30% of 10 atm, i.e. 3 atm is very disadvantageous economically; therefore, a pressure loss of 10% (1 atm) or less is preferred.

Next, the following calculations were made for the preparation of an apparatus for selective oxidation of carbon monoxide. A reaction tube including a stainless steel tube having an inner diameter of 25 mm is provided, a porous alumina tube having an outer diameter of 17 mm and a thickness of 2.5 mm is inserted into the stainless steel tube, and a catalyst is filled between the above two tubes. The reaction portion of the apparatus has an effective length of 200 mm. A reactive gas composed of 20% of hydrogen, 10% of water, 1,000 ppm of carbon monoxide and the remainder of nitrogen is passed through the catalyst-filled portion.

When the space velocity of the reactive gas is 80,000 h$^{-1}$, the velocity is calculated as follows:

$$\{(2.5 \times 2.5 - 1.7 \times 1.7)/4\} \times 3.14 \times 20 \times 80,000 = 4,220,160 \text{ Nml/h} = 70.4 \text{ Nl/min.}$$

Meanwhile, the amount of carbon monoxide (1,000 ppm) fed is calculated as follows:

$$70,400 \times 0.001 = 70.4 \text{ Nml/min.}$$

The amount of oxygen required is equimolar to carbon monoxide, i.e. 70.4 Nml/min. This is because oxygen in an equimolar amount to that of carbon monoxide is required to attain the complete selective oxidation of carbon monoxide. The amount of air required is calculated as 5 times the amount of oxygen required, i.e. 352 Nml/min.

Since the surface area of the porous alumina is $1.7 \times 3.14 \times 20 = 106.8$ cm$^2$, the required amount of air passing through the unit surface area of the porous alumina is calculated as in the following formula (2):

$$352/106.8 = 3.3 \text{ Nml/min·cm}^2 \quad (2)$$

Meanwhile, the inter-diffusion coefficient of the gases can be calculated from the above formula (1) (Fujita's formula).

Here, there is calculated an interdiffusion coefficient D between hydrogen (having the largest diffusion velocity) and oxygen, both of which are main components.

Calculation of the formula (1) is made by substituting T (temperature)=433 K (160° C.), $M_1$ (hydrogen mass)=2, $M_2$ (oxygen mass)=32, $Tc_1$ (critical temperature of hydrogen)= 32.98 K, $Pc_1$ (critical pressure of hydrogen)=1.293 MPa= 12.8 atm, $Tc_2$ (critical temperature of oxygen)=154.58 K, and $Pc_2$ (critical pressure of oxygen)=5.043 MPa=49.8 atm, whereby are obtained D=1.53 cm$^2$/sec and average diffusion distance per second=$(1.53 \times 1)^{1/2}$=1.24 cm/sec.

Therefore, in order to prevent the counter-diffusion of hydrogen gas into air side, the linear velocity of diffusion of oxygen is required to be 74.4 cm/min or more as shown in the following formula (3):

$$1.24 \text{ cm/sec} = 74.4 \text{ cm/min} \quad (3)$$

In this respect, please note that the obtained linear diffusion velocity is one for the case of hydrogen gas having the largest linear velocity. Thus, the required linear velocity would become small in the case of another reaction gas, such as hydrocarbon.

Then, the porosity of the first feeding section is calculated, by comparing an amount per unit area of air (2) to be required for the reaction with an amount per unit area of air (3) to be required for the prevention of hydrogen diffusion to the direction opposite to the follow of the air through the through-holes calculated from the diffusion-velocity. That is, the porosity can be calculated from the above-mentioned formula (2)/the above-mentioned formula (3) and becomes $3.3/74.4 \times 100 = 0.044 \times 100 = 4.4\%$.

Thus, when a porous body has a porosity of 4.4% or less at the rate of 3.3 Nml/min cm$^2$ or more, the linear velocity of diffusion of oxygen becomes a desired level or more. However, since a smaller porosity gives a larger pressure loss, a large porosity is preferably used in designing. Hence, the porosity is most suitably 4.4%.

As described above, the present invention provides an apparatus for contact reactions between different gases, which can specify and control the feeding conditions of different reactive gases comprehensively and appropriately, which can give rise to uniform contact and reaction of the gases and which can give improved productivity.

What is claimed is:

1. An apparatus for contact reactions between different gases, comprising:

a hollow body consisting of a first feeding section made of a porous material having through-pores; and a second feeding section formed to surround said first feeding section;

wherein said first feeding section receives a first reactive gas, and said second feeding section receives a second reactive gas such that the first reactive gas is successively diffused toward said second feeding section via said through-pores to enable a contact reaction between the first reactive gas and the second reactive gas through said through-pores of said first feeding section;

wherein a total area of end openings of said through-pores present on an outer surface of said first feeding section facing an internal surface of said second feeding section is sufficient to match an amount of the second reactive gas; and wherein each of said end openings of said through-pores has a sufficient area to show a linear velocity of diffusion of the first reactive gas at said end openings of said through-pores in an axial direction of said through-pores that is larger than a linear velocity of diffusion of the second reactive gas at said end openings of said through-pores in the opposite axial direction of said through-pores with respect to the diffusion direction of the first reactive gas.

2. The apparatus for contact reactions between different gases according to claim 1, wherein said first feeding section has a porosity in a range of 1 to 50%.

3. The apparatus for contact reactions between different gases according to claim 1, wherein said total area of said end openings of said through-pores is such that the linear velocity of diffusion of the first reactive gas at said end openings of said through-pores in the axial direction of said through-pores is at least equal to a value in a range of 0.3 to 1.4 cm/sec.

4. The apparatus for contact reactions between different gases according to claim 1, wherein a total pressure loss in said through-pores of said first feeding section is 3 atm or less.

5. The apparatus for contact reactions between different gases according to claim 1, wherein the first reactive gas is oxygen or air and the second reactive gas is a hydrocarbon.

6. The apparatus for contact reactions between different gases according to claim 1, wherein said first feeding section has a cylindrical shape.

* * * * *